(12) United States Patent
Uchimura et al.

(10) Patent No.: US 8,488,950 B2
(45) Date of Patent: Jul. 16, 2013

(54) REPRODUCING APPARATUS AND REPRODUCING METHOD, DATA STRUCTURE, RECORDING MEDIUM, RECORDING APPARATUS AND RECORDING METHOD, AND PROGRAM

(75) Inventors: Kouichi Uchimura, Kanagawa (JP); Motoki Kato, Kanagawa (JP); Shinobu Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 13/122,898

(22) PCT Filed: Aug. 10, 2010

(86) PCT No.: PCT/JP2010/063513
§ 371 (c)(1),
(2), (4) Date: Apr. 6, 2011

(87) PCT Pub. No.: WO2011/021529
PCT Pub. Date: Feb. 24, 2011

(65) Prior Publication Data
US 2011/0194844 A1     Aug. 11, 2011

(30) Foreign Application Priority Data

Aug. 18, 2009  (JP) ................................. 2009-189109
May 18, 2010   (JP) ................................. 2010-114578

(51) Int. Cl.
*H04N 5/93* (2006.01)
*H04N 9/80* (2006.01)
*H04N 5/775* (2006.01)

(52) U.S. Cl.
USPC .............. 386/353; 386/230; 386/248; 348/42

(58) Field of Classification Search
USPC .............................. 348/42; 386/230, 353, 248
See application file for complete search history.

(56) References Cited

U.S. PATENT DOCUMENTS

2009/0142041 A1    6/2009  Nagasawa et al.
2009/0263029 A1*  10/2009  Chang et al. .................. 382/232
(Continued)

FOREIGN PATENT DOCUMENTS

EP    2 387 246 A2    11/2011
EP    2 453 661 A1     5/2012
(Continued)

OTHER PUBLICATIONS

International Search Report Issued Sep. 21, 2010 in PCT/JP10/063513 filed Aug. 10, 2010.

(Continued)

*Primary Examiner* — Helen Shibru
(74) *Attorney, Agent, or Firm* — Oblon, Spivak, McClelland, Maier & Neustadt, L.L.P.

(57) ABSTRACT

The present invention relates to a reproducing apparatus and a reproducing method, a data structure, a recording medium, a recording apparatus and a recording method, and a program that enable, in a case where offset information of a sub-image is arranged in a stream of a main image, easy realization of 3D display of the sub-image based on the offset information.

A right-eye video stream includes offset metadata for generating offset information. In a data portion of each TS packet of the right-eye video stream, only any one of video data of an encoded right-eye main image and offset metadata is arranged. In a header of each TS packet of the right-eye video stream, transport priority, which indicates whether data arranged in the data portion of the TS packet is video data of an encoded right-eye main image or offset metadata, is described. The present invention can be applied to, for example, a reproducing apparatus that displays a sub-image in a 3D manner.

16 Claims, 14 Drawing Sheets

U.S. PATENT DOCUMENTS

| | | | |
|---|---|---|---|
| 2011/0013890 A1* | 1/2011 | Sasaki et al. | 386/357 |
| 2011/0037833 A1* | 2/2011 | Lee et al. | 348/46 |
| 2011/0090312 A1* | 4/2011 | Uchimura | 348/43 |
| 2012/0020640 A1* | 1/2012 | Uchimura | 386/230 |
| 2012/0106929 A1* | 5/2012 | Ikeda et al. | 386/248 |

FOREIGN PATENT DOCUMENTS

| | | |
|---|---|---|
| JP | 11 289555 | 10/1999 |
| JP | 2004 274125 | 9/2004 |
| JP | 2009 100070 | 5/2009 |
| JP | 2009 135686 | 6/2009 |
| WO | WO 2005/114998 A1 | 12/2005 |
| WO | WO 2006/038715 A1 | 4/2006 |
| WO | WO 2009/083863 A1 | 7/2009 |

OTHER PUBLICATIONS

Japanese Office Action issued Dec. 27, 2011 in patent application No. 2010-114578.

Supplementary European Search Report issued May 14, 2013, in European Patent Application No. 10809874.0-1902/2337368 PCT/JP2010063513.

* cited by examiner

FIG. 4

| Syntax | No. of bits | Mnemonic |
|---|---|---|
| Transport packet () { | | |
|   sync_byte | 8 | bslbf |
|   transport_error_indicator | 1 | bslbf |
|   payload_unit_start_indicator | 1 | bslbf |
|   transport_priority | 1 | uimsbf |
|   PID | 13 | bslbf |
|   transport_scrambling_control | 2 | bslbf |
|   adaptation_field_control | 2 | bslbf |
|   continuity_counter | 4 | bslbf |
|   if(adaptation_field_control=="10"||adaptation_field_control=="11") { | | |
|     adaptation_field() | | |
|   } | | |
|   if(adaptation_field_control=="01"||adaptation_field_control=="11") { | | |
|     for(i=0;i<N;i++) { | | |
|       data_byte | 8 | bslbf |
|     } | | |
|   } | | |
| } | | |

HEADER (sync_byte through continuity_counter)

DATA PORTION (data_byte)

FIG. 11

| Syntax | No of bits |
|---|---|
| offset_metadata() { | |
|   marker_bit | 1 |
|   reserved_for_future_use | 3 |
|   frame_rate | 4 |
|   reserved_for_future_use | 5 |
|   offset_start_PTS[32..30] | 3 |
|   marker_bit | 1 |
|   offset_start_PTS[29..15] | 15 |
|   marker_bit | 1 |
|   offset_start_PTS[29..15] | 15 |
|   marker_bit | 1 |
|   number_of_frames | 8 |
|   reserved_for_future_use | 1 |
|   marker_bit | 1 |
|   number_of_PG_offset_sequences | 6 |
|   reserved_for_future_use | 1 |
|   marker_bit | 1 |
|   number_of_IG_offset_sequences | 6 |
|   for (int i=0;<br>    i<number_of_PG_offset_sequences;<br>    i++) { | |
|     PG_offset_sequence() | |
|   } | |
|   for (int i=0;<br>    i<number_of_IG_offset_sequences;<br>    i++) { | |
|     IG_offset_sequence() | |
|   } | |
| } | |

FIG. 12

| Syntax | No of bits |
|---|---|
| PG_Offset_sequence () { | |
| for (i=0; i<number_of_frames; i++) { | |
| offset_direction_flag | 1 |
| offset_value | 7 |
| } | |
| } | |

A

| Syntax | No of bits |
|---|---|
| IG_Offset_sequence () { | |
| for (i=0; i<number_of_frames; i++) { | |
| offset_direction_flag | 1 |
| offset_value | 7 |
| } | |
| } | |

B

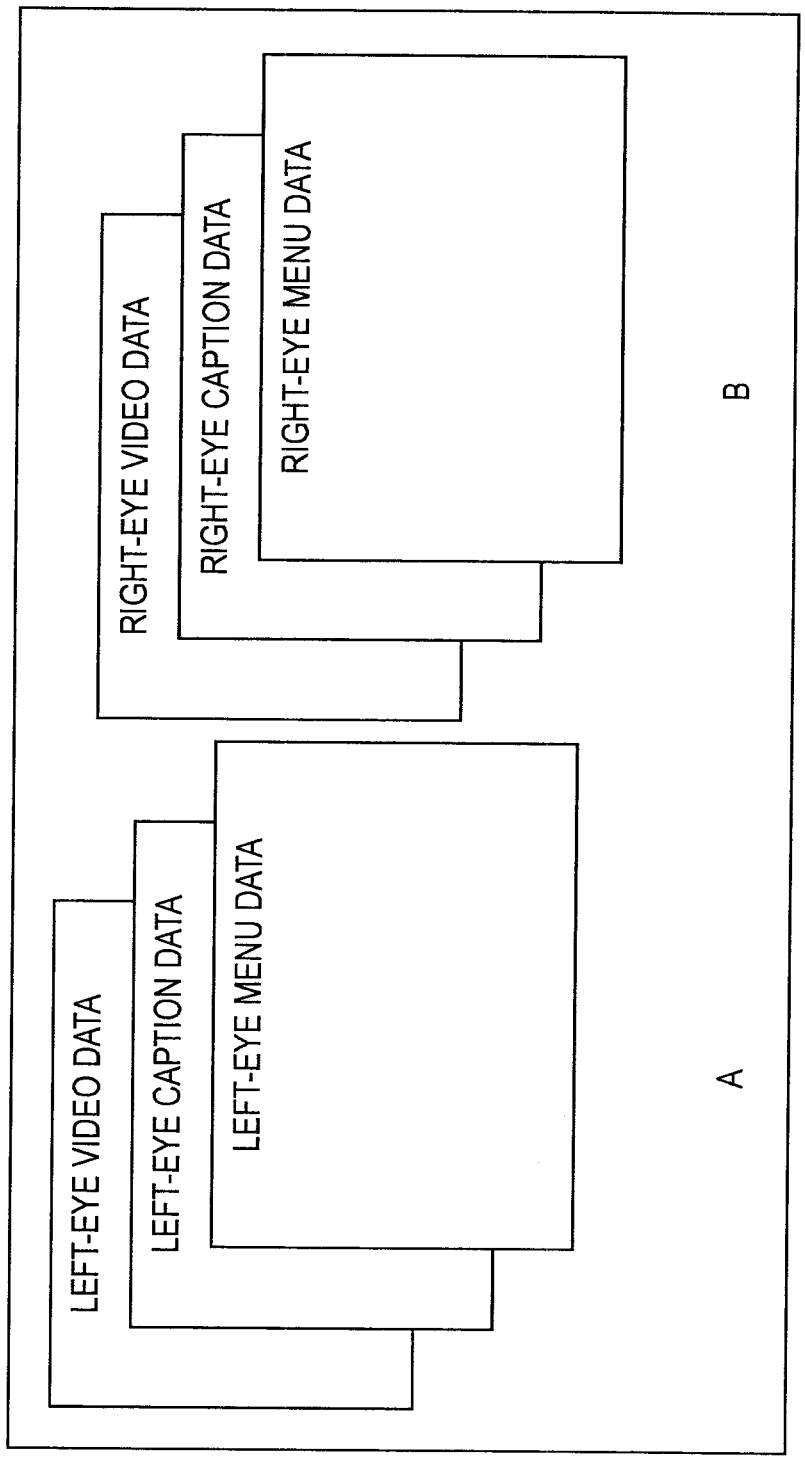

REPRODUCING APPARATUS AND REPRODUCING METHOD, DATA STRUCTURE, RECORDING MEDIUM, RECORDING APPARATUS AND RECORDING METHOD, AND PROGRAM

TECHNICAL FIELD

The present invention relates to a reproducing apparatus and a reproducing method, a data structure, a recording medium, a recording apparatus and a recording method, and a program. Particularly, the present invention relates to a reproducing apparatus and a reproducing method, a data structure, a recording medium, a recording apparatus and a recording method, and a program that enable, in a case where offset information of a sub-image is arranged in a stream of a main image, easy realization of 3D display of the sub-image based on the offset information.

BACKGROUND ART 2D images are mainly used as movie content or the like, but recently 3D images have been receiving attention.

An example of a method for allowing a user to watch a 3D image includes a method for allowing the user to watch one of two images with the left eye and allowing the user to watch the other image with the right eye, the two images separated from each other by a certain distance in a certain direction.

In this method, in order to display a 3D image, it is necessary to prepare both a left-eye image and a right-eye image or to prepare a certain image, direction information indicating a combination of shift directions of left-eye and right-eye images with respect to the image, and an offset value representing a shift amount. Note that, hereinafter, the direction information and the offset value are collectively referred to as offset information.

Also, an example of an encoding method for an image that is used in the case of preparing both a left-eye image and a right-eye image includes an MVC (Multi-view Video coding) method (see PTL 1, for example) or the like.

Then, in order to perform 3D display of a sub-image (for example, a caption, a menu button, or the like) that is to be displayed together with a main image such as movie, offset information of the sub-image may be arranged in a stream of the main image that is encoded using the MVC method or the like.

CITATION LIST

Patent Literature

PTL 1: Japanese Unexamined Patent Application Publication No. 2009-100070

SUMMARY OF INVENTION

Technical Problem

However, in this case, if the stream of the main image is transformed into TS (Transport Stream) packets without using a specific method, it becomes impossible to decode the stream of the main image using a general-purpose decoder. That is, it is necessary to extract each of video data and offset information of the main image from the TS packets of the main image and decode them, and thus it is necessary to prepare a dedicated decoder. This accordingly requires development cost, and 3D display of a sub-image cannot be easily realized.

The present invention has been made in view of such circumstances, and is directed to enabling, in a case where offset information of a sub-image is arranged in a stream of a main image, easy realization of 3D display of the sub-image based on the offset information.

Solution to Problem

A reproducing apparatus according to a first aspect of the present invention is a reproducing apparatus including, in the case of reproducing data having a data structure that includes packets of a sub-image stream, which is a stream of a certain sub-image, and packets of a video stream, which is a stream of an encoded main image and is a stream including offset information composed of a shift direction and a shift amount of a left-eye sub-image and a right-eye sub-image used for 3D display with respect to the certain sub-image, only any one of video data of the encoded main image and the offset information being arranged in a data portion of each of the packets of the video stream, flag information being described in a header of each of the packets of the video stream, the flag information being information indicating whether data arranged in the data portion of the packet is the video data of the encoded main image or the offset information, reading means for reading the packets of the sub-image stream and the video stream, extracting means for extracting packets in which the offset information is arranged in the data portion from among the packets read by the reading means on the basis of the flag information described in the header of the packets, generating means for generating video data of the left-eye sub-image and video data of the right-eye sub-image from the packets of the sub-image stream on the basis of the offset information arranged in the data portion of the packets extracted by the extracting means, and decoding means for decoding the video data of the encoded main image included in the data portion of the packets read by the reading means on the basis of the flag information described in the header of the packets.

A reproducing method and a program according to the first aspect of the present invention correspond to the reproducing apparatus according to the first aspect of the present invention.

In the first aspect of the present invention, in the case of reproducing data having a data structure that includes packets of a sub-image stream, which is a stream of a certain sub-image, and packets of a video stream, which is a stream of an encoded main image and is a stream including offset information composed of a shift direction and a shift amount of a left-eye sub-image and a right-eye sub-image used for 3D display with respect to the certain sub-image, only any one of video data of the encoded main image and the offset information being arranged in a data portion of each of the packets of the video stream, flag information being described in a header of each of the packets of the video stream, the flag information being information indicating whether data arranged in the data portion of the packet is the video data of the encoded main image or the offset information, the packets of the sub-image stream and the video stream are read, packets in which the offset information is arranged in the data portion are extracted from among the read packets on the basis of the flag information described in the header of the packets, video data of the left-eye sub-image and video data of the right-eye sub-image are generated from the packets of the sub-image stream on the basis of the offset information arranged in the data portion of the extracted packets, and the video data of the encoded main image included in the data portion of the read packets are decoded on the basis of the flag information described in the header of the packets.

A data structure according to a second aspect of the present invention and a data structure of data recorded on a recording medium is a data structure including packets of a sub-image stream, which is a stream of a certain sub-image, and packets of a video stream, which is a stream of an encoded main image and is a stream including offset information composed of a shift direction and a shift amount of a left-eye sub-image and a right-eye sub-image used for 3D display with respect to the certain sub-image, only any one of video data of the encoded main image and the offset information being arranged in a data portion of each of the packets of the video stream, flag information being described in a header of each of the packets of the video stream, the flag information being information indicating whether data arranged in the data portion of the packet is the video data of the encoded main image or the offset information.

In the second aspect of the present invention, packets of a sub-image stream, which is a stream of a certain sub-image, and packets of a video stream, which is a stream of an encoded main image and is a stream including offset information composed of a shift direction and a shift amount of a left-eye sub-image and a right-eye sub-image used for 3D display with respect to the certain sub-image are included, only any one of video data of the encoded main image and the offset information is arranged in a data portion of each of the packets of the video stream, and flag information is described in a header of each of the packets of the video stream, the flag information being information indicating whether data arranged in the data portion of the packet is the video data of the encoded main image or the offset information.

A recording apparatus according to a third aspect of the present invention is a recording apparatus including encoding means for encoding video data of a main image, generating means for generating packets in which offset information is arranged in a data portion and flag information indicating that data arranged in the data portion is the offset information is described in a header so that the video data encoded by the encoding means and the offset information are not included in an identical packet, the offset information being composed of a shift direction and a shift amount of a left-eye sub-image and a right-eye sub-image used for 3D display with respect to a certain sub-image, and generating packets in which the encoded video data is arranged in a data portion and flag information indicating that data arranged in the data portion is the encoded video data is described in a header, and recording control means for causing the packets to be recorded on a recording medium.

A recording method and a program according to the third aspect of the present invention correspond to the recording apparatus according to the third aspect of the present invention.

In the third aspect of the present invention, video data of a main image is encoded, packets in which offset information is arranged in a data portion and flag information indicating that data arranged in the data portion is the offset information is described in a header so that the encoded video data and the offset information are not included in an identical packet are generated, the offset information being composed of a shift direction and a shift amount of a left-eye sub-image and a right-eye sub-image used for 3D display with respect to a certain sub-image, packets in which the encoded video data is arranged in a data portion and flag information indicating that data arranged in the data portion is the encoded video data is described in a header are generated, and the packets are recorded on a recording medium.

Advantageous Effects of Invention

As described above, according to the present invention, in a case where offset information of a sub-image is arranged in a stream of a main image, 3D display of the sub-image based on the offset information can be easily realized.

BRIEF DESCRIPTION OF DRAWINGS

FIG. 4 is a diagram illustrating a specific example configuration of a TS packet.

FIG. 11 is a diagram illustrating an example of description of offset metadata.

FIG. 12 is a diagram illustrating an example of description of offset metadata.

FIG. 14 is a diagram describing superimposition order in 3D display data.

DESCRIPTION OF EMBODIMENTS

Figure 1:
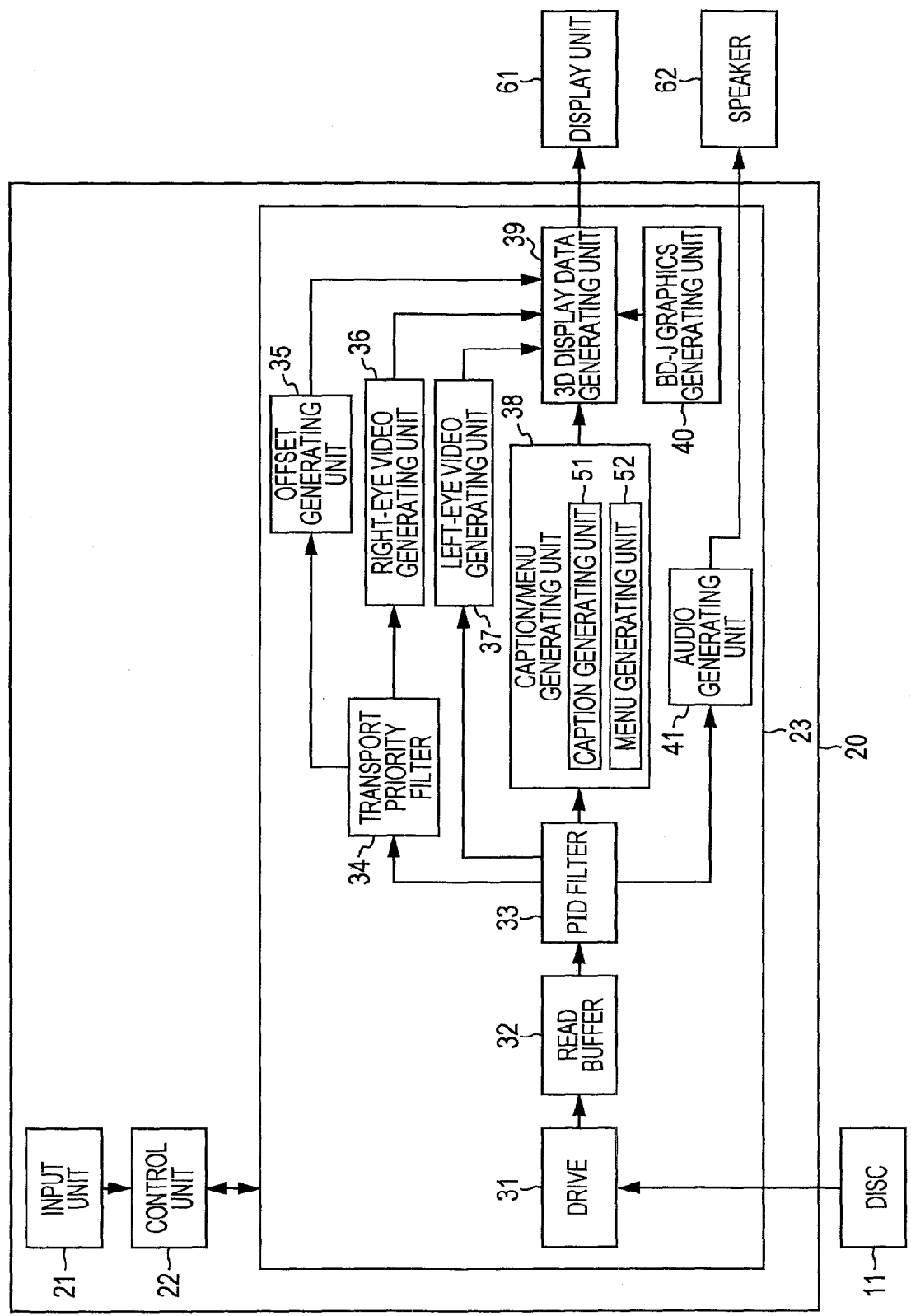
FIG. 1 is a block diagram illustrating an example configuration of an embodiment of a reproducing apparatus to which the present invention is applied.

<First Embodiment>
[Example Configuration of Reproducing Apparatus]
FIG. 1 is a block diagram illustrating an example configuration of an embodiment of a reproducing apparatus to which the present invention is applied.

The reproducing apparatus 20 in FIG. 1 is constituted by an input unit 21, a control unit 22, and a reproducing unit 23.

The input unit 21 is made up of a keyboard, a mouse, a microphone, and the like. The input unit 21 receives an instruction from a user and supplies it to the control unit 22. The control unit 22 controls the reproducing unit 23 in response to the instruction supplied from the input unit 21.

The reproducing unit 23 is constituted by a drive 31, a read buffer 32, a PID filter 33, a transport priority filter 34, an offset generating unit 35, a right-eye video generating unit 36, a left-eye video generating unit 37, a caption/menu generating unit 38, a 3D display data generating unit 39, a BD-J graphics generating unit 40, and an audio generating unit 41.

The drive 31 drives a disc 11, which is a BD (Blu-Ray (registered trademark) Disc) or the like, loaded therein in accordance with the control performed by the control unit 22.

Accordingly, the drive 31 reads an index file, a movie object file, a BD-J object file, a playlist file, a clip information file, a stream file, and the like recorded on the disc 11.

Note that the index file is a file in which a list of title numbers recorded on the disc 11 and the types and numbers of objects executed in accordance with the title numbers are described. The types of objects include two types: a movie object and a BD-J object.

Also, the movie object file is a file in which a plurality of movie objects are described. In a movie object, a program called a navigation command is described. Note that, hereinafter, if a navigation command is not particularly required to be distinguished, it is simply referred to as a command.

Furthermore, the BD-J object file is a file in which a plurality of BD-J applications are described. The playlist file is a file that is reproduced only by a movie object or a BD-J object, and information about an AV stream (the details will be described below) that is reproduced with a single command described in these objects is described therein.

Specifically, the playlist file is constituted by a single or a plurality of play items. In each play item, information specifying a clip information file corresponding to an AV stream to be reproduced and time information indicating a reproduction period of the AV stream are described.

The AV stream is recorded as a stream file on the disc 11. The AV stream is constituted by TS (Transport Stream) packets that are obtained by multiplexing a left-eye video stream and a right-eye video stream, an audio stream corresponding thereto, a caption stream, and a menu stream in accordance with ISO13818-2.

Note that the left-eye video stream is a stream of a left-eye main image that is encoded using the MVC method. The right-eye video stream is a stream of a right-eye main image that is encoded using the MVC method, and is a stream including offset metadata (the details will be described below). Also, the caption stream is a stream including data in a bitmap format or text format for displaying a caption in a 2D manner. The menu stream is a stream including data for displaying a menu button in a 2D manner.

The offset metadata is data for generating offset information in units of pictures. Specifically, the offset metadata is constituted by offset information, a PTS (Presentation Time Stamp) of the first picture in which the offset information is set, and a frame rate indicating the intervals of pictures in which the offset information is set. Note that the offset information is described for each caption corresponding to the reproduction period of 1 GOP, menu button, and screen (plane) of BD-J graphics. Also, in the BD-ROM (Blu-Ray Disc-Read Only Memory) standard, a menu button and BD-J graphics are in an exclusive relationship, and thus the offset information is applied to the screen of a caption and the screen of a menu button, or is applied to the screen of a caption and the screen of BD-J graphics. The details about examples of description of offset metadata will be described with reference to FIG. 11 and FIG. 12 described below.

The clip information file is a file in which a map that associates time information described in the playlist file with packet numbers of an AV stream is described. Thus, by referring to the clip information file, the control unit 22 can recognize the packet number of the AV stream to be reproduced corresponding to each play item. The stream file is a file of an AV stream.

The drive 31 supplies the read index file, movie object file, BD-J object file, playlist file, clip information file, and the like to the control unit 22. The drive 31 supplies the AV stream of the read stream file to the read buffer 32.

The read buffer 32 holds the AV stream supplied from the drive 31, and reads the AV stream held therein and supplies it to the PID filter 33 in accordance with the control performed by the control unit 22.

The PID filter 33 extracts, from the AV stream, the TS packets of a left-eye video stream, a right-eye video stream, a caption stream, a menu stream, and an audio stream on the basis of the packet IDs (PIDs) of the respective TS packets of the AV stream supplied from the read buffer 32. Note that the PID is an ID unique to each type of data constituting a TS packet, and is described in the header of the packet.

The PID filter 33 supplies the extracted TS packets of the right-eye video stream to the transport priority filter 34, and supplies the TS packets of the left-eye video stream to the left-eye video generating unit 37. Also, the PID filter 33 supplies the TS packets of the caption stream and the menu stream to the caption/menu generating unit 38, and supplies the TS packets of the audio stream to the audio generating unit 41.

The transport priority filter 34 supplies certain TS packets among the TS packets of the right-eye video stream supplied from the PID filter 33 to the offset generating unit 35 on the basis of the transport priority described in the headers of the TS packets. Also, the transport priority filter 34 supplies the TS packets of the right-eye video stream supplied from the PID filter 33 to the right-eye video generating unit 36.

The offset generating unit 35 generates offset information on the basis of offset metadata that is arranged in the data portion of the TS packets supplied from the transport priority filter 34, and supplies it to the 3D display data generating unit 39.

The right-eye video generating unit 36 decodes video data of a right-eye main image that is arranged in the data portion of the TS packets of the right-eye video stream supplied from the transport priority filter 34 on the basis of the transport priority described in the headers of the TS packets. The right-eye video generating unit 36 regards the video data obtained as a result of the decoding as right-eye video data, and supplies it to the 3D display data generating unit 39.

Also, the left-eye video generating unit 37 decodes video data of a left-eye image that is included in the TS packets of the left-eye video stream supplied from the PID filter 33. The left-eye video generating unit 37 regards the video data obtained as a result of the decoding as left-eye video data, and supplies it to the 3D display data generating unit 39.

The caption/menu generating unit 38 is constituted by a caption generating unit 51 and a menu generating unit 52. The caption generating unit 51 supplies caption data included in the TS packets of the caption stream supplied from the PID filter 33 to the 3D display data generating unit 39 at the execution of a movie object.

The menu generating unit 52 supplies menu data included in the TS packets of the menu stream supplied from the PID filter 33 to the 3D display data generating unit 39 at the execution of a movie object.

The 3D display data generating unit 39 regards the right-eye video data supplied from the right-eye video generating unit 36 and the left-eye video data supplied from the left-eye video generating unit 37 as 3D video data. Also, the 3D display data generating unit 39 generates right-eye caption data and left-eye caption data, which are caption data of captions generated by shifting a caption corresponding to the caption data supplied from the caption generating unit 51 by a certain offset value in a certain offset direction, on the basis of the offset information supplied from the offset generating unit 35. Then, the 3D display data generating unit 39 regards the right-eye caption data and the left-eye caption data as 3D caption data for displaying the caption in a 3D manner.

Also, the 3D display data generating unit 39 generates 3D menu data for displaying a menu button in a 3D manner from the menu data supplied from the menu generating unit 52, like the 3D caption data, on the basis of the offset information supplied from the offset generating unit 35.

Furthermore, the 3D display data generating unit 39 combines the 3D video data, 3D caption data, and 3D menu data for the individual pieces of data for left and right eyes. Specifically, the 3D display data generating unit 39 combines the left-eye video data, the left-eye caption data, and the left-eye menu data to generate left-eye display data. Also, the 3D display data generating unit 39 combines the right-eye video data, the right-eye caption data, and the right-eye menu data to generate right-eye display data.

Also, the 3D display data generating unit 39 generates 3D graphics data for displaying BD-J graphics in a 3D manner from the graphics data that is supplied from the BD-J graphics generating unit 40 and that is for displaying BD-J graphics including a menu button and the like in a 2D manner, like the 3D caption data, on the basis of the offset information supplied from the offset generating unit 35.

The 3D display data generating unit 39 combines the 3D video data and the 3D graphics data for the individual pieces of data for left and right eyes, regards a combining result for the left eye as left-eye display data, and regards a combining result for the right eye as right-eye display data. Then, the 3D display data generating unit 39 supplies the left-eye display data and the right-eye display data to a display unit 61 as 3D display data, and causes a left-eye image and a right-eye image to be displayed on the display unit 61.

The BD-J graphics generating unit 40 generates graphics data in accordance with the control performed by the control unit 22 at the execution of a BD-J object, and supplies it to the 3D display data generating unit 39.

The audio generating unit 41 decodes audio data included in the TS packets of the audio stream supplied from the PID filter 33, and supplies the audio data obtained thereby to a speaker 62.

The display unit 61 is constituted by a 3D display or the like. The display unit 61 displays a left-eye image and a right-eye image on the basis of the 3D display data supplied from the 3D display data generating unit 39. As a result, a user can watch a 3D image.

The speaker 62 outputs the audio corresponding to the audio data supplied from the audio generating unit 41.

[Example Configuration of Right-Eye Video Stream]

Figure 2:
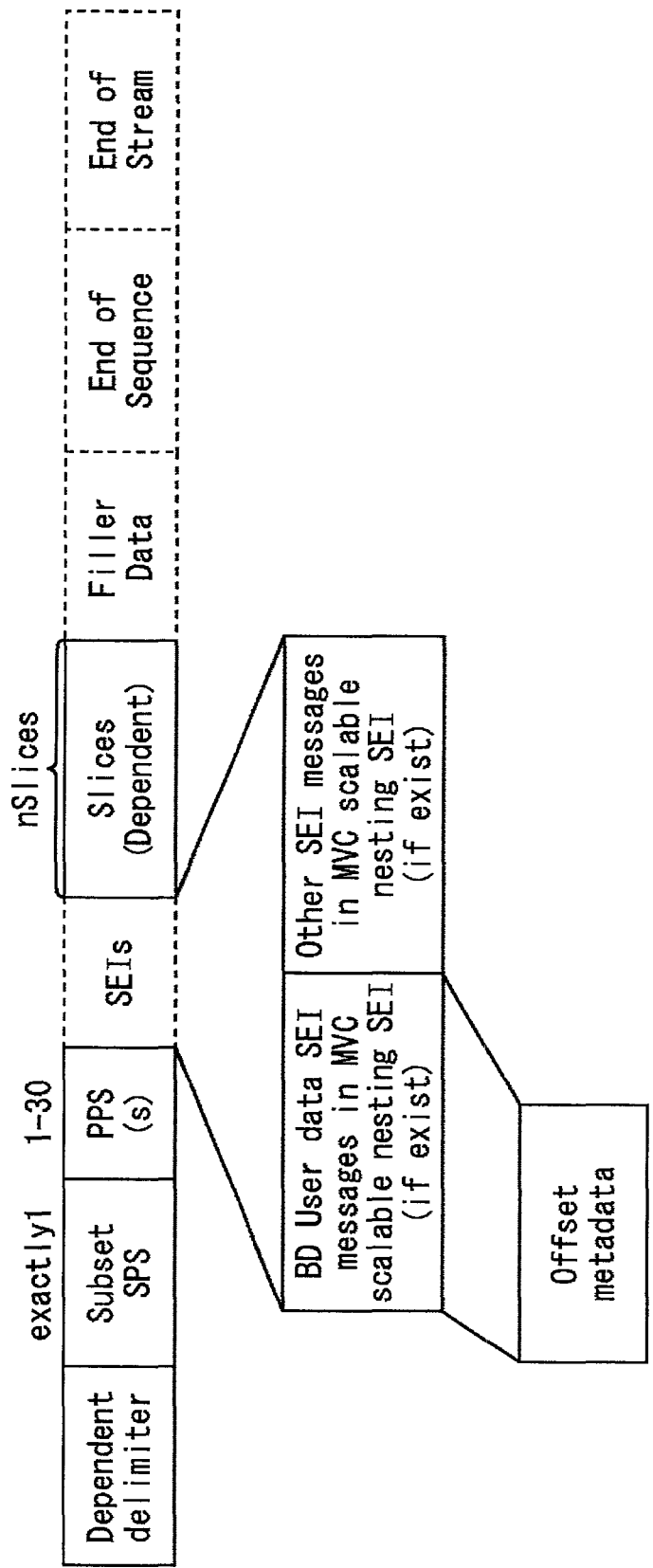
FIG. 2 is a diagram illustrating an example configuration of the first dependent unit in display order in each GOP of a right-eye video stream.

FIG. 2 is a diagram illustrating an example configuration of the first dependent unit (picture) in the display order in each GOP (Group of Picture) of a right-eye video stream.

As illustrated in FIG. 2, in the first dependent unit in the display order in each GOP of a right-eye video stream, Dependent delimiter, SPS (Sequence Parameter Set), Subset PPS (Picture Parameter Set), SEI (Supplemental Enhancement Information), and one or more slices are arranged in this order from the top.

Dependent delimiter is a start code indicating the top of the dependent unit. Dependent delimiter includes, for example, information indicating the type of slices included in the dependent unit.

SPS is a header including information about the entire sequence. SPS includes, for example, information indicating the profile of the right-eye video stream and information indicating the level of the right-eye video stream. Also, for example, SPS includes information that is necessary for calculating POC (Picture Order Count). POC is information indicating the display order of the picture.

PPS is a header including information about the picture. For example, PPS includes information that is necessary for calculating POC.

SEI is information indicating additional information that is not essential for decoding VCL (Video Coding Layer). SEI can be classified into user SEI information (BD User data SEI messages in MVC scalable nesting SEI), which is information uniquely defined by a user as a creator of the disc 11, and other information (Other SEI messages in MVC scalable nesting SEI). On the disc 11, offset metadata is described as at least user SEI information. The slices are video data of a right-eye main image that is encoded using the MVC method and are substantial data of the picture.

Note that, after the one or more slices, Filler Data, End of Sequence, and End of Stream are arranged as necessary.

Filler Data is data that is added for adjusting a data size. End of Sequence is information indicating the end of the sequence. End of Stream is information indicating the end of the right-eye video stream.

Figure 3:
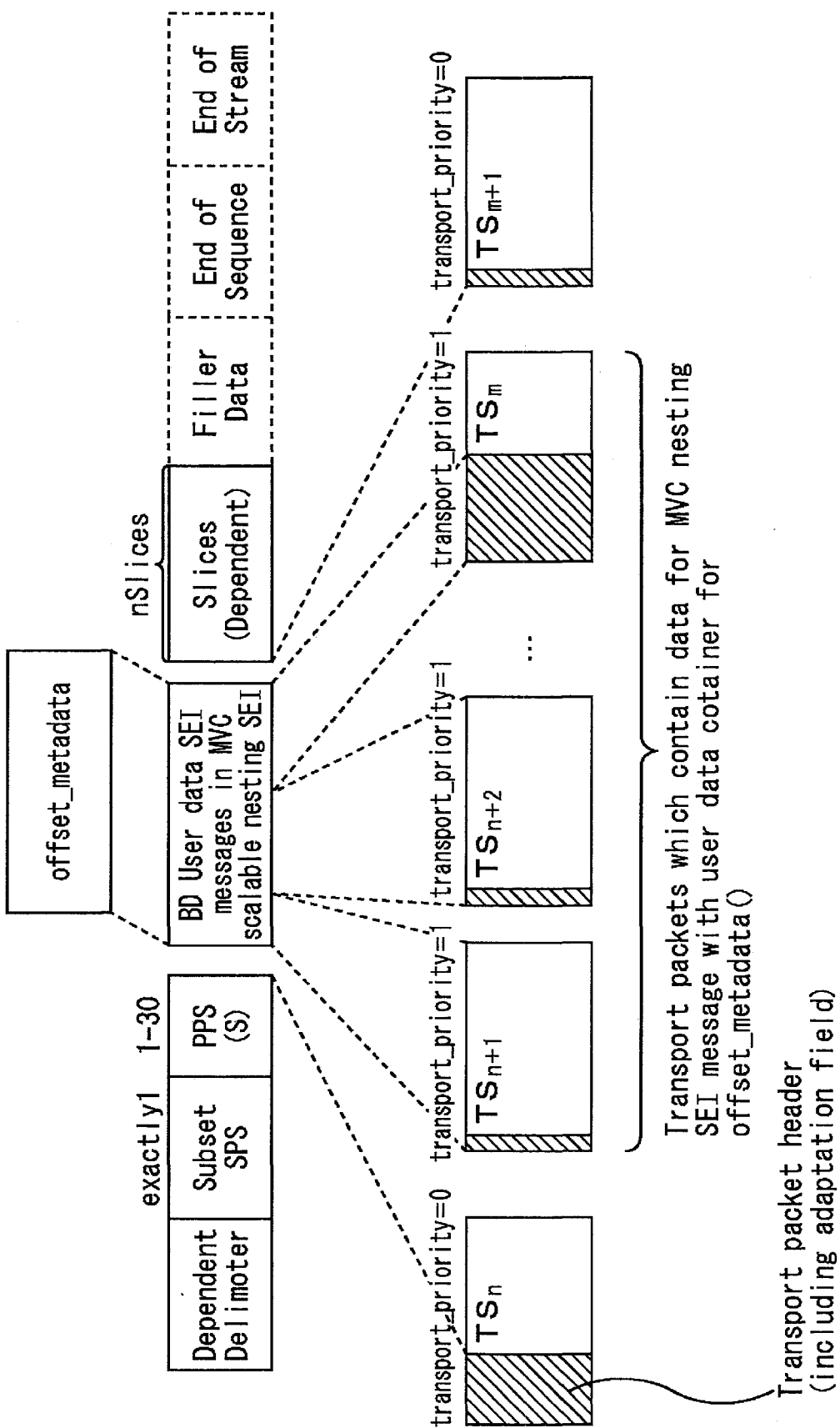
FIG. 3 is a diagram describing a method for generating TS packets of a right-eye video stream.

FIG. 3 is a diagram describing a method for generating TS packets of a right-eye video stream.

As illustrated in FIG. 3, the right-eye video stream is TS-packetized so that offset metadata is not arranged in TS packets together with other data.

Specifically, as illustrated in FIG. 3, if the data size of data for the last TS packet $TS_n$ of PPS is smaller than the data size of the data portion of a TS packet, arbitrary stuffing bytes are inserted into the header of the TS packet $TS_n$ using the adaptation field of the header so that the data size of the TS packet $TS_n$ becomes the same as the data size of the TS packet. Accordingly, the top of the offset metadata is packetized into a TS packet $TS_{n+1}$, which is different from the preceding TS packet $TS_n$ in which PPS is arranged. Note that $TS_i$ represents the i-th TS packet.

Also, as illustrated in FIG. 3, if the data size of data for the last TS packet $TS_m$ of the offset metadata is smaller than the data size of the data portion of the TS packet, arbitrary stuffing bytes are inserted into the header of the TS packet $TS_m$ using the adaptation field of the header so that the data size of the TS packet $TS_m$ becomes the same as the data size of the TS packet. Accordingly, the top of slices is packetized into a TS packet $TS_{m+1}$, which is different from the preceding TS packet $TS_m$ in which the offset metadata is arranged.

Furthermore, as illustrated in FIG. 3, transport priority of zero is described in the headers of the TS packets of the data other than the offset metadata. Also, transport priority of one is described in the headers of the TS packets of the offset metadata.

Specifically, as illustrated in FIG. 4, each TS packet is constituted by a header at the top and a data portion following the header.

As illustrated in FIG. 4, a synchronization byte (sync_byte) of eight bits, a transport error indicator (transport_error indicator) of one bit, and a payload unit start indicator (payload_unit_start_indicator) of one bit are descried in the header. Also, transport priority (transport_priority) of one bit, a PID of thirteen bits, and transport scrambling control (transport_scrambling_control) of two bits are described in the header. Furthermore, adaptation field control (adaptation_field_control) of two bits and a continuity counter (continuity_counter) of two bits are described in the header. Note that the continuity counter is data that is incremented by one every frame.

If the adaptation field control has a certain value ("10" and "11" in the example in FIG. 4), an adaptation field serving as an expanded header is further arranged in the header.

Also, if the adaptation field control has a certain value ("01" and "11" in the example in FIG. 4), a payload is stored in the data portion. A right-eye video stream is stored as the payload, for example.

In a TS packet of the right-eye video stream, if offset metadata is described as a payload, transport priority of one is described in the header of the TS packet. On the other hand, if data other than the offset metadata is described as a payload, transport priority of zero is described in the header of the TS packet including the payload.

That is, transport priority is used as flag information indicating whether the data arranged in the data portion is offset metadata or data other than the offset metadata.

Thus, the reproducing apparatus 20 can extract TS packets including offset metadata from among the TS packets of the right-eye video stream on the basis of transport priority.

[Specific Example Configuration of Right-Eye Video Generating Unit and Offset Generating Unit]

Figure 5:
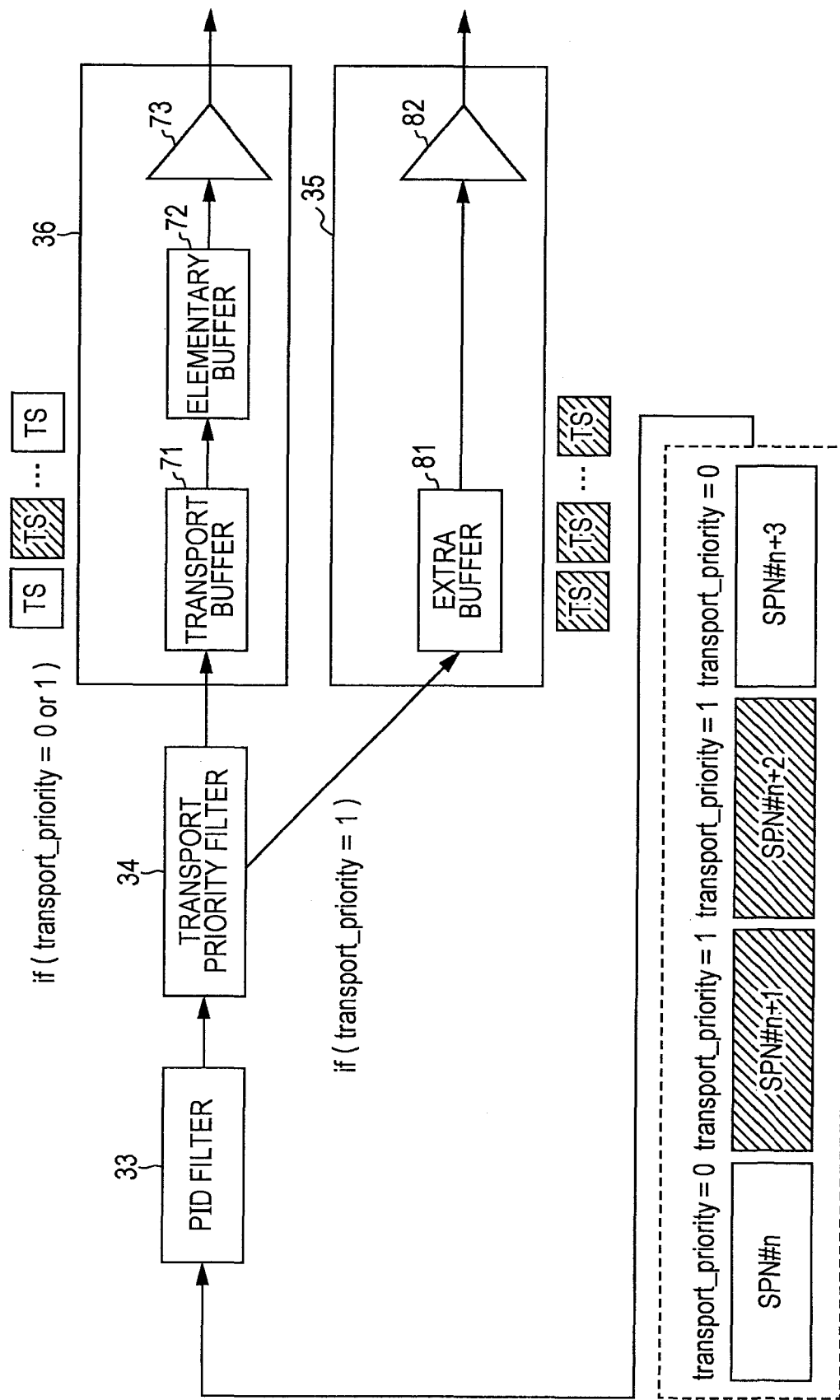
FIG. 5 is a block diagram illustrating a specific example configuration of a right-eye video generating unit and an offset generating unit.

FIG. 5 is a block diagram illustrating a specific example configuration of the right-eye video generating unit 36 and the offset generating unit 35 in FIG. 1.

As illustrated in FIG. 5, TS packets including a header with transport priority of zero or one are input to the PID filter 33. In the example in FIG. 5, the n-th to n+3-th TS packets from the top are input to the PID filter 33. The transport priority of the n-th and n+3-th TS packets is zero, and the transport priority of the n+1-th and n+2-th TS packets is one.

The PID filter 33 extracts the TS packets of a right-eye video stream from among the input TS packets on the basis of the PIDs described in the headers of the input TS packets, and supplies them to the transport priority filter 34.

The transport priority filter 34 supplies all the TS packets supplied from the PID filter 33 to the right-eye video generating unit 36 or supplies only the TS packets with transport priority of zero to the right-eye video generating unit 36.

Also, if the transport priority described in the header of a TS packet supplied from the PID filter 33 is one, the transport priority filter 34 supplies the TS packet to the offset generating unit 35. Accordingly, the offset generating unit 35 is supplied with only TS packets of the right-eye video stream with transport priority of one, that is, only the TS packets in which offset metadata is arranged in the data portion.

The right-eye video generating unit 36 is constituted by a transport buffer 71, an elementary buffer 72, and a video decoder 73.

The transport buffer 71 accumulates TS packets supplied from the transport priority filter 34. The transport buffer 71 reads the accumulated TS packets at a certain bit rate and supplies them to the elementary buffer 72. The elementary buffer 72 accumulates the TS packets supplied from the transport buffer 71.

The video decoder 73 is constituted by a general-purpose MVC decoder. The video decoder 73 extracts video data of a right-eye main image arranged in the data portion of the TS packets with transport priority of zero among the TS packets accumulated in the elementary buffer 72 at certain timing on the basis of the transport priority of the TS packets. Then, the video decoder 73 decodes the video data of the right-eye main image using the method corresponding to the MVC method, and supplies the video data obtained thereby to the 3D display data generating unit 39 (FIG. 1) as right-eye video data.

The offset generating unit 35 is constituted by an extra buffer 81 and an offset decoder 82.

The extra buffer 81 accumulates TS packets with transport priority of one supplied from the transport priority filter 34.

The offset decoder 82 extracts offset metadata arranged in the data portion of the TS packets accumulated in the extra buffer 81 at certain timing. The offset decoder 82 generates offset information on the basis of the offset metadata and supplies it to the 3D display data generating unit 39 (FIG. 1).

[Process Performed by Reproducing Apparatus]

Figure 6:
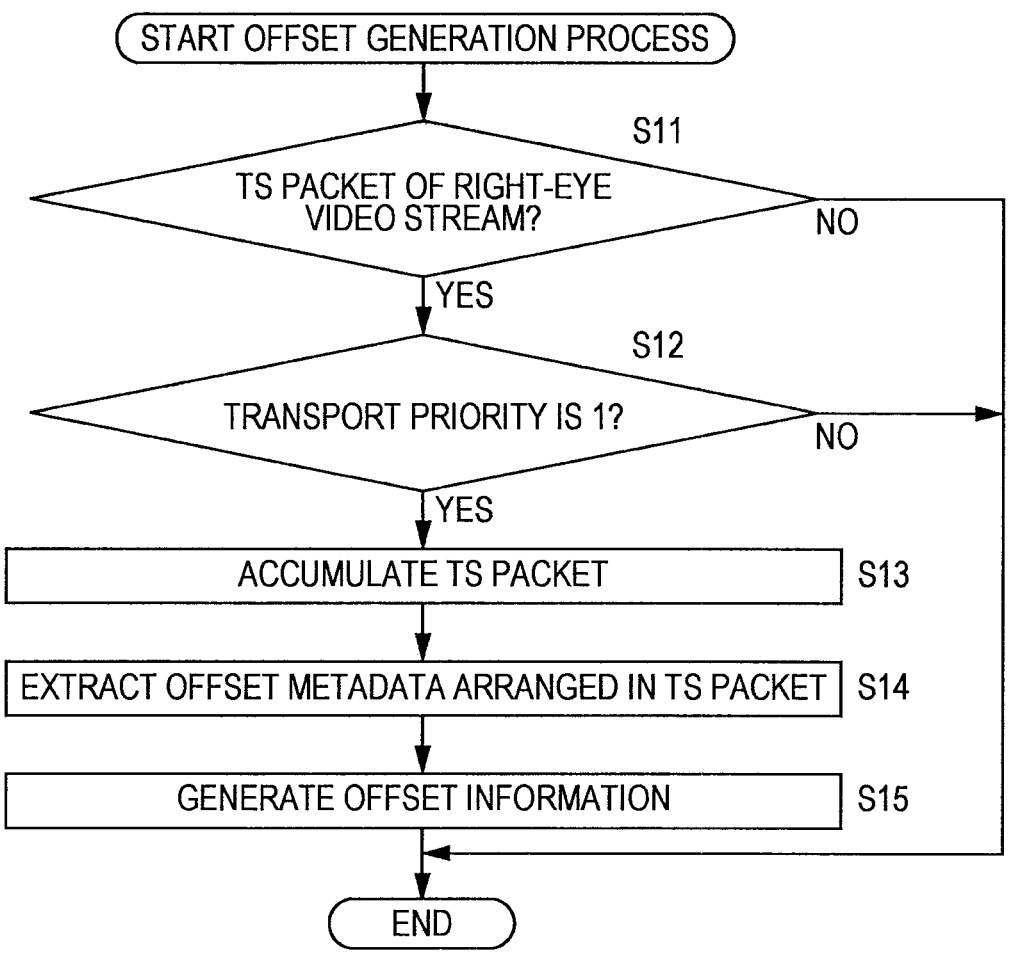
FIG. 6 is a flowchart describing an offset generation process performed by the reproducing apparatus.

FIG. 6 is a flowchart describing an offset generation process performed by the reproducing apparatus 20. This offset generation process starts when a new TS packet is input to the PID filter, for example.

In step S11, the PID filter 33 determines whether the input TS packet is a TS packet of a right-eye video stream or not on the basis of the PID of the TS packet. If it is determined in step S11 that the input TS packet is not a TS packet of the right-eye video stream, the process ends.

On the other hand, if it is determined in step S11 that the input TS packet is a TS packet of the right-eye video stream, the PID filter 33 supplies the TS packet to the transport priority filter 34.

Then, in step S12, the transport priority filter 34 determines whether the transport priority described in the header of the TS packet supplied from the PID filter 33 is one or not. If it is determined in step S12 that the transport priority is not one, that is, if the transport priority is zero, the process ends.

On the other hand, if it is determined in step S12 that the transport priority is one, the transport priority filter 34 supplies the TS packet supplied from the PID filter 33 to the transport buffer 71 (FIG. 5) and the extra buffer 81.

Then, in step S13, the extra buffer 81 accumulates the TS packet supplied from the transport priority filter 34.

In step S14, the offset decoder 82 extracts offset metadata arranged in the data portion of the TS packet accumulated in the extra buffer 81.

In step S15, the offset decoder 82 generates offset information on the basis of the offset metadata extracted in step S14 and supplies it to the 3D display data generating unit 39. Then, the process ends.

Figure 7:
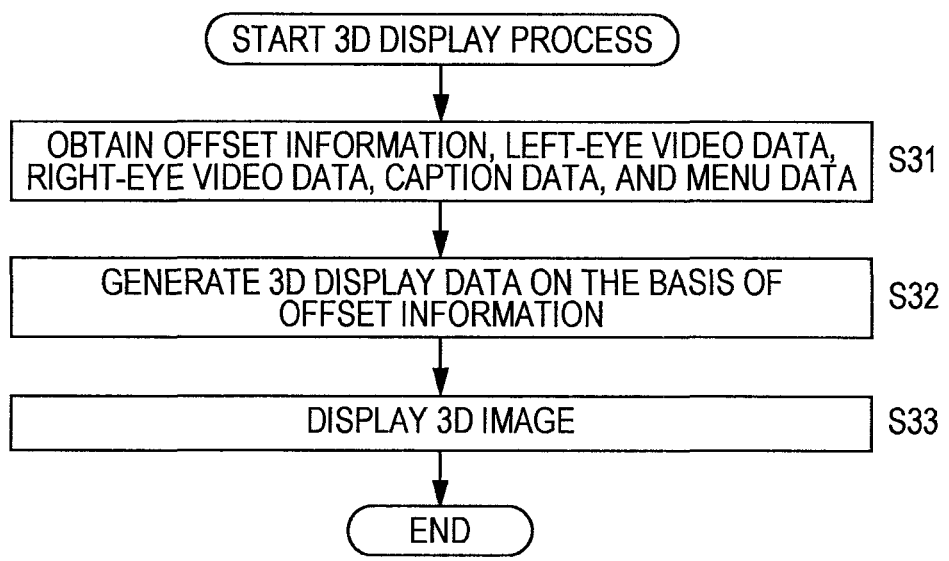
FIG. 7 is a flowchart of a 3D display process performed by the reproducing apparatus at the execution of a movie object.

FIG. 7 is a flowchart of a 3D display process performed by the reproducing apparatus 20 at the execution of a movie object. This 3D display process starts when offset metadata, left-eye video data, right-eye video data, caption data, and menu data are input to the 3D display data generating unit 39, for example.

In step S31, the 3D display data generating unit 39 obtains offset information input from the offset generating unit 35, right-eye video data input from the right-eye video generating unit 36, left-eye video data input from the left-eye video generating unit 37, caption data input from the caption generating unit 51, and menu data input from the menu generating unit 52.

In step S32, the 3D display data generating unit 39 generates 3D display data from the right-eye video data, the left-eye video data, the caption data, and the menu data on the basis of the offset information.

In step S33, the 3D display data generating unit 39 causes a 3D image to be displayed on the display unit 61 on the basis of the 3D display data generated in step S32. Then, the process ends.

Note that a 3D display process at the execution of a BD-J object is similar to the 3D display process in FIG. 7 except that graphics data is used instead of caption data and menu data, and thus the description is omitted.

[Example Configuration of Recording Apparatus]

Figure 8:
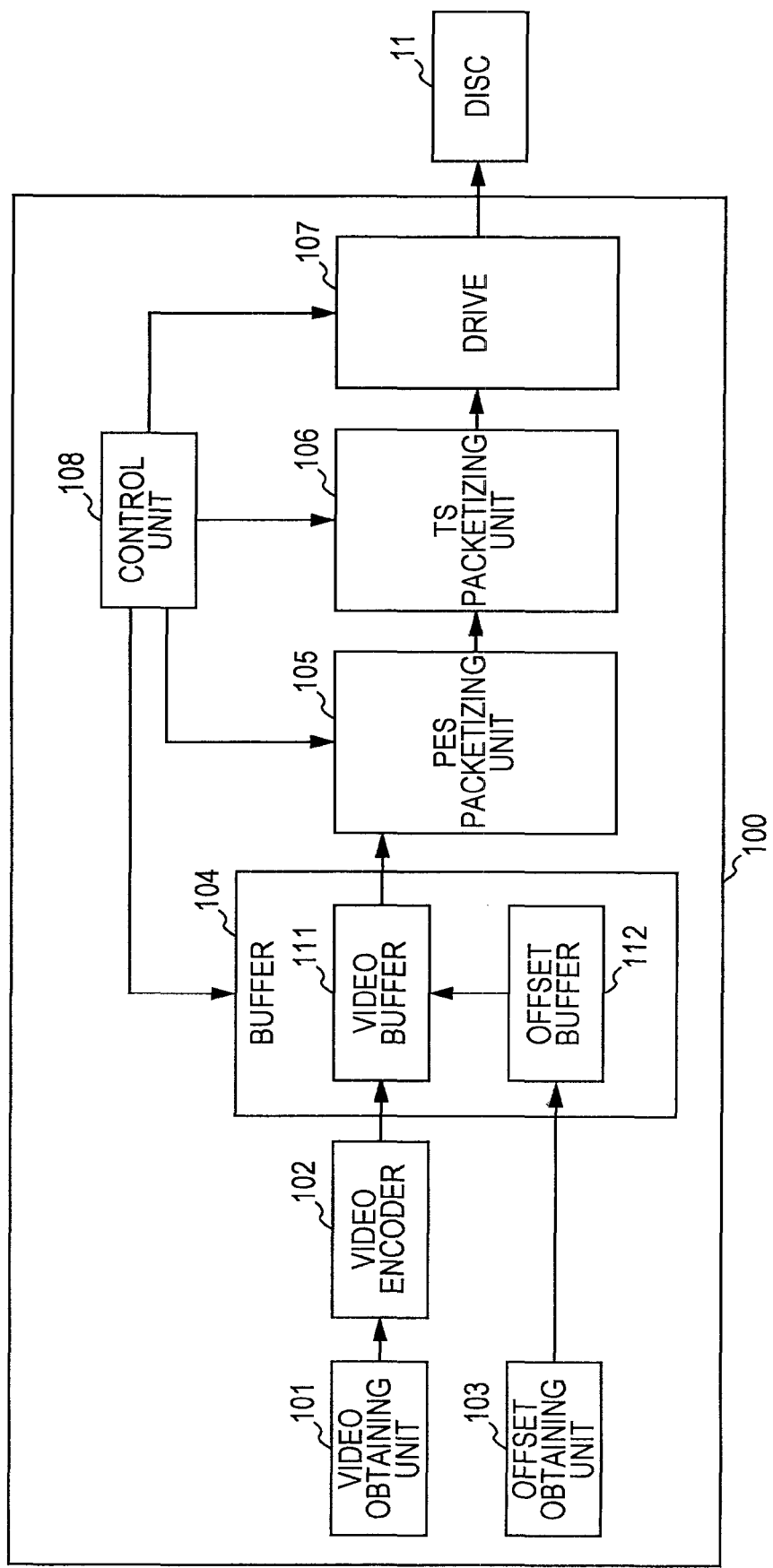
FIG. 8 is a block diagram illustrating an example configuration of a recording apparatus.

FIG. 8 is a block diagram illustrating an example configuration of a recoding apparatus 100 that records a right-eye video stream on the disc 11.

The recording apparatus 100 in FIG. 8 is constituted by a video obtaining unit 101, a video encoder 102, an offset obtaining unit 103, a buffer 104, a PES packetizing unit 105, a TS packetizing unit 106, a drive 107, and a control unit 108.

The video obtaining unit 101 obtains video data of a right-eye main image input from the outside, and supplies it to the video encoder 102. The video encoder 102 encodes the video data supplied from the video obtaining unit 101 using the MVC method, and supplies an ES (Elementary Stream) obtained thereby to the buffer 104. Note that the SEI of this ES is provided with a reserved area for arranging offset metadata.

The offset obtaining unit 103 obtains offset metadata input from the outside, and supplies the offset metadata to the buffer 104.

The buffer 104 is constituted by a video buffer 111 and an offset buffer 112. The video buffer 111 stores the ES of the video data supplied from the video encoder 102. The video buffer 111 reads the ES stored therein on the basis of the control performed by the control unit 108, arranges the offset metadata supplied from the offset buffer 112 in the reserved area provided in the SEI of the ES, and supplies the ES to the PES packetizing unit 105.

The offset buffer 112 stores the offset metadata supplied from the offset obtaining unit 103. The offset buffer 112 reads the offset metadata stored therein on the basis of the control performed by the control unit 108, and supplies it to the video buffer 111.

The PES packetizing unit 105 packetizes the ES supplied from the video buffer 111 into PES packets on the basis of the control performed by the control unit 108.

The TS packetizing unit 106 packetizes the PES packets supplied from the PES packetizing unit 105 into TS packets on the basis of the transport priority supplied from the control unit 108. Specifically, the TS packetizing unit 106 generates TS packets each including a header with transport priority supplied from the control unit 108 being described therein and including a PES packet arranged in the data portion. The PID corresponding to the right-eye video stream is also described in the header of the TS packets. The TS packetizing unit 106 supplies the generated TS packets to the drive 107.

The drive 107 records the TS packets supplied from the TS packetizing unit 106 on the disc 11 on the basis of the control performed by the control unit 108.

The control unit 108 monitors the ES of the video data and offset metadata stored in the buffer 104. Also, the control unit 108 manages the PTS. Furthermore, the control unit 108 controls the individual units of the PES packetizing unit 105, the TS packetizing unit 106, and the drive 107.

Specifically, for example, if PES-packetized video data is input to the TS packetizing unit 106, the control unit 108 supplies transport priority of zero to the TS packetizing unit 106. On the other hand, if PES-packetized offset metadata is input to the TS packetizing unit 106, the control unit 108 supplies transport priority of one to the TS packetizing unit 106.

[Description of Process Performed by Recording Apparatus]

Figure 9:
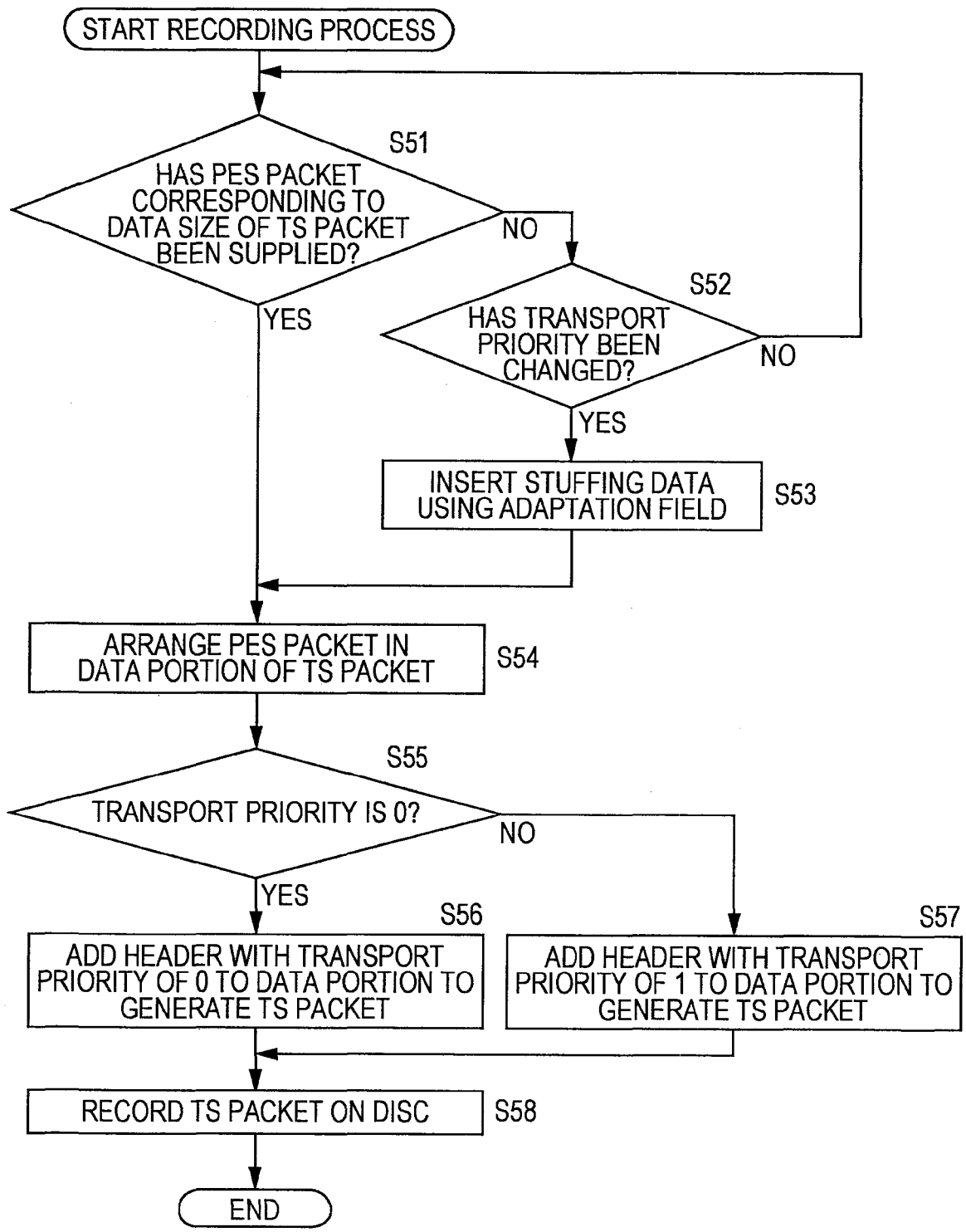
FIG. 9 is a flowchart describing a recording process performed by the recording apparatus.

FIG. 9 is a flowchart describing a recording process performed by the recording apparatus 100 in FIG. 8. This recording process starts when a PES packet is input from the PES packetizing unit 105 to the TS packetizing unit 106, for example.

In step S51, the TS packetizing unit 106 determines whether a PES packet corresponding to the data size of the data portion of a TS packet has been supplied or not. If the PES packet corresponding to the data size of the data portion of the TS packet has not been supplied in step S51, the process proceeds to step S52.

In step S52, the TS packetizing unit 106 determines whether the transport priority supplied from the control unit 108 has been changed or not. If it is determined in step S52 that the transport priority has not been changed, the process returns to step S51. Then, the process in steps S51 and S52 is repeated until the PES packet corresponding to the data size of the data portion of the TS packet has been supplied or until the transport priority has been changed.

On the other hand, if it is determined in step S52 that the transport priority has been changed, the process proceeds to step S53. In step S53, the TS packetizing unit 106 inserts stuffing data into the header of the TS packet to be generated using an adaptation field so that the data size of the TS packet to be generated in which the PES packet supplied from the PES packetizing unit 105 is arranged in the data portion becomes the same as the data size of the TS packet. Specifically, the TS packetizing unit 106 inserts stuffing data corresponding to the value obtained by subtracting the data size of the PES packet from the data size of the data portion of the TS packet into the adaptation field of the header of the TS packet. Then, the process proceeds to step S54.

Also, if it is determined in step S51 that the PES packet corresponding to the data size of the data portion of the TS packet has been supplied, the process proceeds to step S54.

In step S54, the TS packetizing unit 106 arranges the PES packet supplied from the PES packetizing unit 105 in the data portion of the TS packet.

In step S55, the TS packetizing unit 106 determines whether the transport priority with respect to the PES packet arranged in the data portion supplied from the control unit 108 is zero or not. If it is determined in step S55 that the transport priority is zero, the process proceeds to step S56.

In step S56, the TS packetizing unit 106 adds the header with transport priority of zero being described therein to the data portion, thereby generating a TS packet. Accordingly, a TS packet in which PES-packetized video data of a right-eye main image is arranged in the data portion and transport priority of zero is described in the header is generated. Then, the TS packetizing unit 106 supplies the generated TS packet to the drive 107, and the process proceeds to step S58.

On the other hand, if it is determined in step S55 that the transport priority is zero, the process proceeds to step S57. In step S57, the TS packetizing unit 106 adds the header with transport priority of one being described therein to the data portion, thereby generating a TS packet. Accordingly, a TS packet in which PES-packetized offset metadata is arranged in the data portion and transport priority of one is described in the header is generated. Then, the TS packetizing unit 106 supplies the generated TS packet to the drive 107, and the proceeds to step S58.

In step S58, the drive 107 records the TS packet supplied from the TS packetizing unit 106 on the disc 11. Then, the process ends.

Note that, in the description given above, offset metadata is included in a right-eye video stream, but the offset metadata may be included in a left-eye video stream. Alternatively, the offset metadata may be included in both the right-eye video stream and left-eye video stream.

Also, in the description given above, encoding is performed so that the right-eye video stream serves as a dependent stream in the MVC method and that the left-eye video stream serves as a base stream in the MVC method, but encoding may be performed so that the left-eye video stream serves as a dependent stream and that the right-eye video stream serves as a base stream.

The present invention can also be applied to a case where a video stream used for 2D display of a main image and offset information of the main image are recorded on a disc. In this case, for example, offset metadata of a sub-image is included in the video stream used for 2D display of the main image, and also the offset information of the main image is included therein.

At least part of the above-described series of processes can be executed by hardware or can be executed by software. In the case of executing at least part of the series of processes by software, a program forming the software is installed from a program recording medium into a computer incorporated in dedicated hardware or a general-purpose personal computer.

Figure 10:
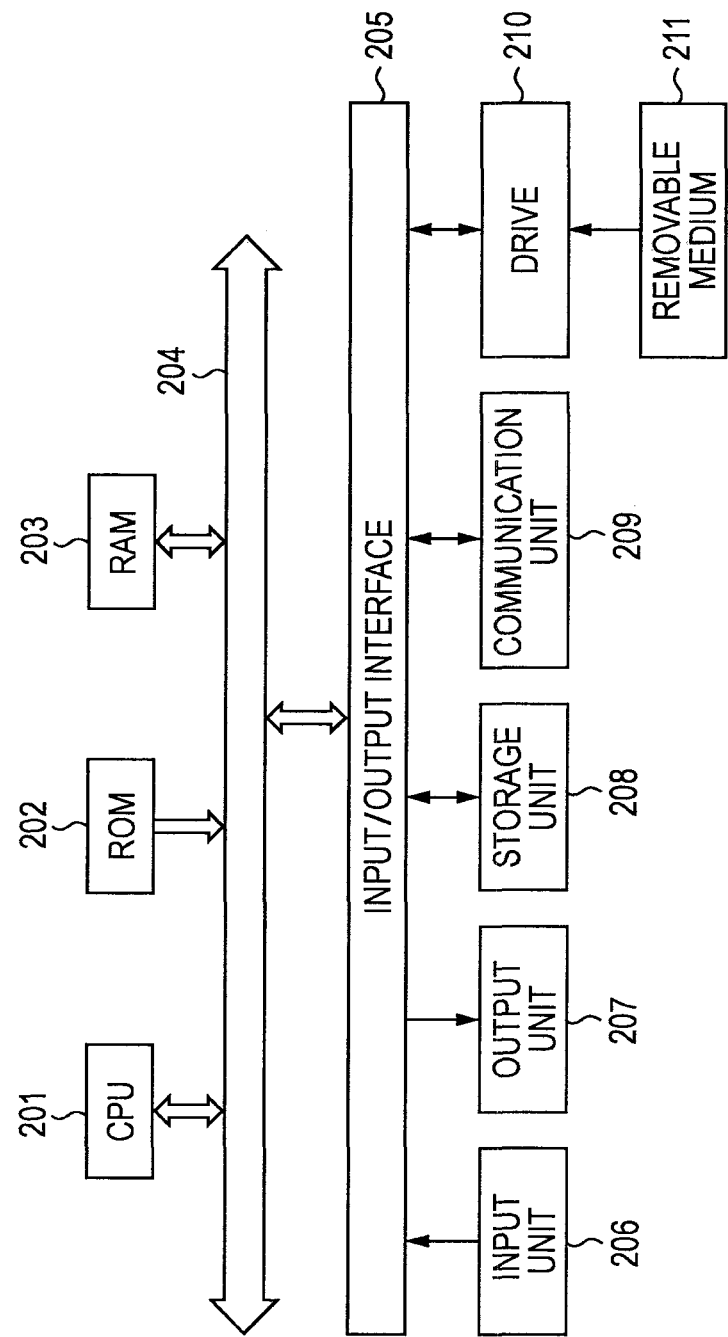
FIG. 10 is a block diagram illustrating an example configuration of hardware of a computer.

FIG. 10 is a block diagram illustrating an example configuration of hardware of a computer that executes at least part of the above-described series of processes in accordance with a program.

A CPU (Central Processing Unit) 201, a ROM (Read Only Memory) 202, and a RAM (Random Access Memory) 203 are mutually connected via a bus 204.

An input/output interface 205 is further connected to the bus 204. An input unit 206 made up of a keyboard, mouse, and the like, and an output unit 207 made up of a display, speaker and the like are connected to the input/output interface 205. Also, a storage unit 208 made up of a hard disk, nonvolatile memory, or the like, a communication unit 209 made up of a network interface or the like, and a drive 210 that drives a removable medium 211 are connected to the bus 204.

In the computer having the above-described configuration, the CPU 201 loads the program stored in the storage unit 208 into the RAM 203 via the input/output interface 205 and the bus 204 and executes it, for example, whereby the above-described series of processes are executed.

The program executed by the CPU 201 is provided while being recorded on the removable medium 211, for example, or via a wired or wireless transmission medium, such as a local area network, the Internet, or digital broadcasting, and is installed in the storage unit 208.

<Examples of Description of Offset Metadata>

FIG. 11 and FIG. 12 are diagrams illustrating examples of description of offset metadata.

As illustrated in FIG. 11, in the offset metadata, the frame rate (frame_rate) of the right-eye video stream including the offset metadata is described using four bits, and the PTS of the first picture (offset_start_PTS) in the display order of the right-eye video stream is described using thirty-three (=3+15+15) bits. With the frame rate and the PTS, the reproduction time of the screen at which offset information is applied can be specified. Also, in the offset metadata, the number of frames (number of frames) of the GOP in which the offset metadata is included in the SEI is described using eight bits. Furthermore, in the offset metadata, the number of types of offset information of a caption that is set in accordance with the GOP (number_of_PG_offset_sequences) and the number of types of offset information of a menu button that is set in accordance with the GOP (number_of_IG_offset_sequences) are described using six bits, respectively. Note that the type of offset information applied to the target to be reproduced is specified using a playlist or the like.

Also, as illustrated in FIG. 11, in the offset data, offset information of a caption (PG_offset_sequence) is described for each type of offset information of a caption, and offset information of a menu button (IG_offset_sequence) is described for each type of offset information of a menu button.

As the offset information (PG_offset_sequence, IG_offset_sequence), the information indicating an offset direction (offset_direction_flag) is described using one bit and the information indicating an offset value (offset_value) is described using seven bits, as illustrated in part A of FIG. 12 and part B of FIG. 12.

As the information indicating an offset direction, the case "0" where the offset direction is the direction in which a 3D image is popped up forward (to the user side) with respect to a display surface is used, and the case "1" where the offset direction is the direction in which a 3D image is displayed behind a display surface is used, for example. In addition, an offset value is represented using the number of pixels, for example.

Furthermore, in the offset metadata, marker bits (marker_bit) of one bit are ubique arranged in order to prevent eight sequential zeros, as illustrated in FIG. 11. Specifically, for example, in decoding in the MVC method, if eight sequential zeros occur in the data to be decoded, the data is determined to be a start code. Thus, the offset metadata includes "1" as a marker bit so that part of the offset metadata does not represent a start code. Also, a reserved area (reserved_for_future_use) is arranged in the offset metadata.

Note that, in the example in FIG. 11, marker bits are arranged in order to prevent eight sequential zeros, but the marker bits may be arranged so that part or the whole of the offset metadata is not recognized as a certain code during decoding, and a method for arranging the marker bits is not limited to the method in FIG. 11.

<Specific Example Configuration of 3D Display Data Generating Unit>

Figure 13:
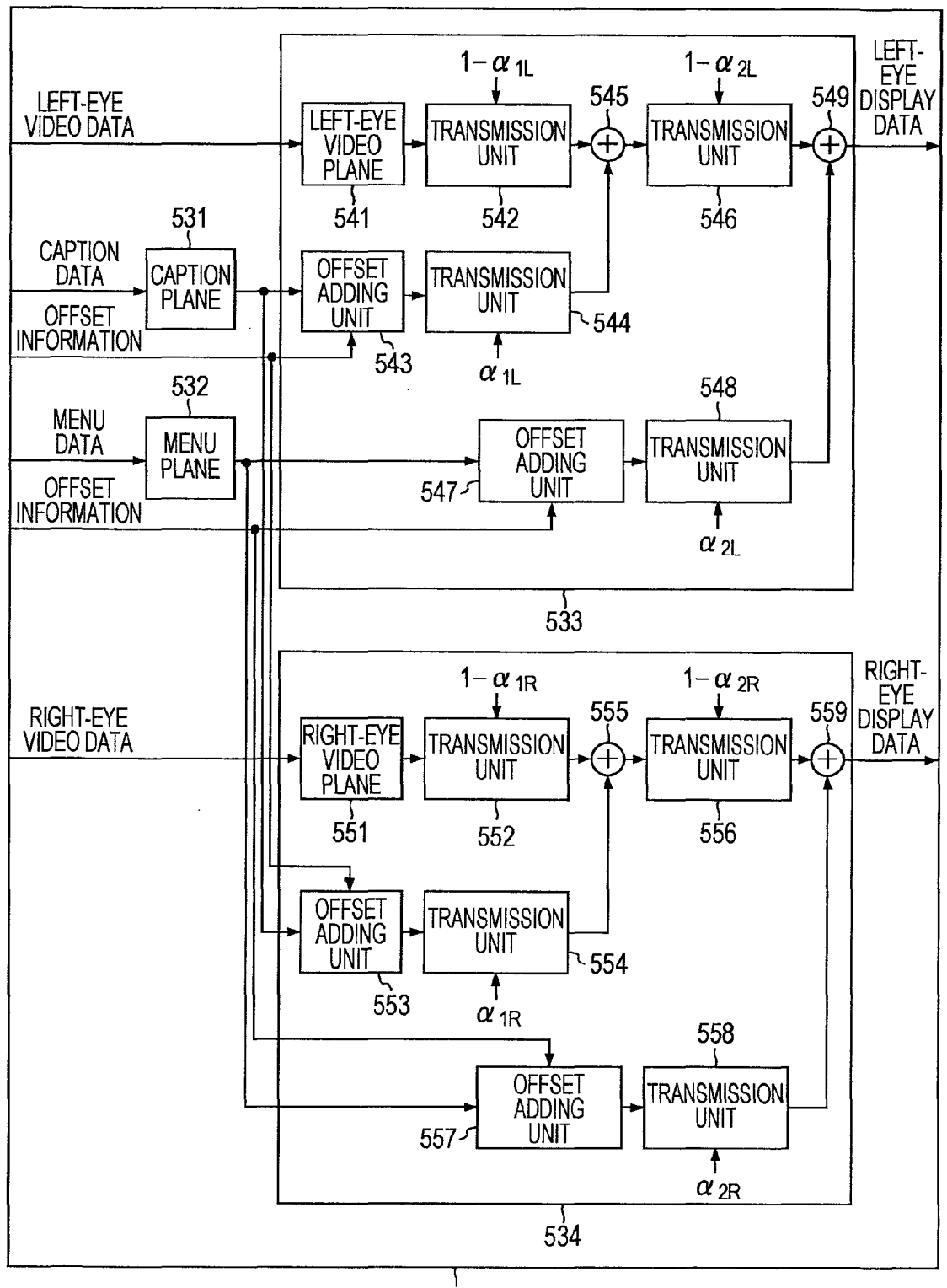
FIG. 13 is a block diagram illustrating a specific example configuration of the 3D display data generating unit in FIG. 1.

FIG. 13 is a block diagram illustrating a specific example configuration of the 3D display data generating unit 39 in FIG. 1.

The 3D display data generating unit 39 in FIG. 13 is constituted by a caption plane 531, a menu plane 532, a left-eye display data generating unit 533, and a right-eye display data generating unit 534.

The caption plane 531 holds the caption data supplied from the caption generating unit 51 (FIG. 1).

The menu plane 532 holds the menu data supplied from the menu generating unit 52 (FIG. 1).

The left-eye display data generating unit 533 is constituted by a left-eye video plane 541, a transmission unit 542, an offset adding unit 543, a transmission unit 544, a combining unit 545, a transmission unit 546, an offset adding unit 547, a transmission unit 548, and a combining unit 549.

The left-eye video plane 541 holds the left-eye video data supplied from the left-eye video generating unit 37 (FIG. 1).

The transmission unit 542 reads the left-eye video data held in the left-eye video plane 541. The transmission unit 542 converts the read left-eye video data so that a left-eye main image is transmitted at a preset transmittance $(1-\alpha_{1L})$. The transmission unit 542 supplies the converted left-eye video data to the combining unit 545.

The offset adding unit 543 reads caption data from the caption plane 531. The offset adding unit 543 generates left-eye caption data from the read caption data on the basis of the offset information of the caption data supplied from the offset generating unit 35 in FIG. 1. The offset adding unit 543 supplies the left-eye caption data to the transmission unit 544.

The transmission unit 544 converts the left-eye caption data supplied from the offset adding unit 547 so that a left-eye caption is transmitted at a preset transmittance $\alpha_{1L}$. The transmission unit 544 supplies the converted left-eye caption data to the combining unit 545.

The combining unit 545 combines the left-eye video data supplied from the transmission unit 542 and the left-eye caption data supplied from the transmission unit 544, and supplies the data obtained thereby to the transmission unit 546.

The transmission unit 546 converts the data supplied from the combining unit 545 so that the image corresponding to the data is transmitted at a transmittance $(1-\alpha_{2L})$, and supplies the data to the combining unit 549.

The offset adding unit 547 reads menu data from the menu plane 532. The offset adding unit 547 generates left-eye menu data from the read menu data on the basis of the offset information of the menu button supplied from the offset generating unit 35 in FIG. 1. The offset adding unit 547 supplies the left-eye menu data to the transmission unit 548.

The transmission unit 548 converts the left-eye menu data supplied from the offset adding unit 547 so that a left-eye menu button is transmitted at a preset transmittance $\alpha_{2L}$. The transmission unit 548 supplies the converted left-eye menu data to the combining unit 549.

The combining unit 549 combines the data supplied from the transmission unit 546 and the menu data supplied from the transmission unit 548, and outputs the data obtained thereby as left-eye display data.

The right-eye display data generating unit 534 is constituted by a right-eye video plane 551, a transmission unit 552, an offset adding unit 553, a transmission unit 554, a combining unit 555, a transmission unit 556, an offset adding unit 557, a transmission unit 558, and a combining unit 559. The process performed by the individual units of the right-eye display data generating unit 534 is similar to the process performed by the individual unit of the left-eye display data generating unit 533 except that the target of the process is right-eye data, and thus the description thereof is omitted.

<Description of Superimposition Order in 3D Display Data>

FIG. 14 is a diagram describing superimposition order in 3D display data generated by the 3D display data generating unit 39.

As illustrated in part A of FIG. 14, the superimposition order of left-eye display data in the 3D display data is left-eye video data, left-eye caption data, and left-eye menu data from the bottom. Also, as illustrated in part B of FIG. 14, the superimposition order of right-eye display data is right-eye video data, right-eye caption data, and right-eye menu data from the bottom.

In this description, the steps describing a program stored in a program recording medium of course include processes that are performed in time series in accordance with the described order, and also include processes that are performed in parallel or individually instead of being performed in time series.

Also, the embodiment of the present invention is not limited to the above-described embodiment, and various modifications are acceptable without deviating from the scope of the present invention.

Reference Signs List

11 disc, 20 reproducing apparatus, 31 drive, 34 transport priority filter, 36 right-eye video generating unit, 39 3D display data generating unit, 100 recording apparatus, 102 video encoder, 106 TS packetizing unit, 107 drive

The invention claimed is:

1. A reproducing apparatus comprising:
   in the case of reproducing data having a data structure that includes
   packets of a sub-image stream, which is a stream of a certain sub-image, and
   packets of a video stream, which is a stream of an encoded main image and is a stream including offset information composed of a shift direction and a shift amount of a left-eye sub-image and a right-eye sub-image used for 3D display with respect to the certain sub-image,
   only any one of video data of the encoded main image and the offset information being arranged in a data portion of each of the packets of the video stream,
   flag information being described in a header of each of the packets of the video stream, the flag information being information indicating whether data arranged in the data portion of the packet is the video data of the encoded main image or the offset information,
   circuitry configured to:
     read the packets of the sub-image stream and the video stream;
     extract packets in which the offset information is arranged in the data portion from among the read packets on the basis of the flag information described in the header of the packets;
     generate video data of the left-eye sub-image and video data of the right-eye sub-image from the packets of the sub-image stream on the basis of the offset information arranged in the data portion of the extracted packets; and
     decode the video data of the encoded main image included in the data portion of the read packets on the basis of the flag information described in the header of the packets.

2. The reproducing apparatus according to claim 1, wherein the video stream is a stream of the main image for any one of a right eye and a left eye encoded using an MVC (Multi-view Video coding) method, and wherein the data further includes video stream of the main image for the other.

3. The reproducing apparatus according to claim 1, wherein part of the offset information includes certain information so that part or the whole of the offset information does not represent a certain code.

4. A reproducing method for a reproducing apparatus for reproducing data having a data structure that includes
   packets of a sub-image stream, which is a stream of a certain sub-image, and
   packets of a video stream, which is a stream of an encoded main image and is a stream including offset information composed of a shift direction and a shift amount of a left-eye sub-image and a right-eye sub-image used for 3D display with respect to the certain sub-image,
   only any one of video data of the encoded main image and the offset information being arranged in a data portion of each of the packets of the video stream,
   flag information being described in a header of each of the packets of the video stream, the flag information being information indicating whether data arranged in the data portion of the packet is the video data of the encoded main image or the offset information,
   the reproducing method comprising:
   a reading step of reading the packets of the sub-image stream and the video stream;
   an extracting step of extracting packets in which the offset information is arranged in the data portion from among the packets read in a process of the reading step on the basis of the flag information described in the header of the packets;

a generating step of generating video data of the left-eye sub-image and video data of the right-eye sub-image from the packets of the sub-image stream on the basis of the offset information arranged in the data portion of the packets extracted in a process of the extracting step; and a decoding step of decoding the video data of the encoded main image included in the data portion of the packets read in a process of the reading step on the basis of the flag information described in the header of the packets.

5. A non-transitory computer-readable medium including a program causing a computer to execute a process, the computer executing control for reproducing data having a data structure that includes packets of a sub-image stream, which is a stream of a certain sub-image, and packets of a video stream, which is a stream of an encoded main image and is a stream including offset information composed of a shift direction and a shift amount of a left-eye sub-image and a right-eye sub-image used for 3D display with respect to the certain sub-image, only any one of video data of the encoded main image and the offset information being arranged in a data portion of each of the packets of the video stream, flag information being described in a header of each of the packets of the video stream, the flag information being information indicating whether data arranged in the data portion of the packet is the video data of the encoded main image or the offset information, the process comprising:

a reading step of reading the packets of the sub-image stream and the video stream;

an extracting step of extracting packets in which the offset information is arranged in the data portion from among the packets read in a process of the reading step on the basis of the flag information described in the header of the packets;

a generating step of generating video data of the left-eye sub-image and video data of the right-eye sub-image from the packets of the sub-image stream on the basis of the offset information arranged in the data portion of the packets extracted in a process of the extracting step; and a decoding step of decoding the video data of the encoded main image included in the data portion of the packets read in a process of the reading step on the basis of the flag information described in the header of the packets.

6. A data structure comprising:

packets of a sub-image stream, which is a stream of a certain sub-image; and packets of a video stream, which is a stream of an encoded main image and is a stream including offset information composed of a shift direction and a shift amount of a left-eye sub-image and a right-eye sub-image used for 3D display with respect to the certain sub-image, only any one of video data of the encoded main image and the offset information being arranged in a data portion of each of the packets of the video stream, flag information being described in a header of each of the packets of the video stream, the flag information being information indicating whether data arranged in the data portion of the packet is the video data of the encoded main image or the offset information.

7. The data structure according to claim 6, wherein the video stream is a stream of the main image for any one of a right eye and a left eye encoded using an MVC (Multi-view Video coding) method, the data structure further comprising video stream of the main image for the other.

8. The data structure according to claim 6, wherein part of the offset information includes certain information so that part or the whole of the offset information does not represent a certain code.

9. A non-transitory recording medium with data having the data structure according to claim 6 being recorded thereon.

10. A recording apparatus comprising:

circuitry configured to:

encode video data of a main image;

generate packets in which offset information is arranged in a data portion and flag information indicating that data arranged in the data portion is the offset information is described in a header so that the encoded video data and the offset information are not included in an identical packet, the offset information being composed of a shift direction and a shift amount of a left-eye sub-image and a right-eye sub-image used for 3D display with respect to a certain sub-image;

generate packets in which the encoded video data is arranged in a data portion and flag information indicating that data arranged in the data portion is the encoded video data is described in a header; and control the packets to be recorded on a recording medium.

11. The recording apparatus according to claim 10, wherein the circuitry is configured to encode the video data of the main image for a left eye or the main image for a right eye using an MVC (Multi-view Video coding) method.

12. The recording apparatus according to claim 10, wherein part of the offset information includes certain information so that part or the whole of the offset information does not represent a certain code.

13. A recording method for a recording apparatus, comprising:

an encoding step of encoding video data of a main image;

a generating step of generating packets in which offset information is arranged in a data portion and flag information indicating that data arranged in the data portion is the offset information is described in a header so that the video data encoded in a process of the encoding step and the offset information are not included in an identical packet, the offset information being composed of a shift direction and a shift amount of a left-eye sub-image and a right-eye sub-image used for 3D display with respect to a certain sub-image, and generating packets in which the encoded video data is arranged in a data portion and flag information indicating that data arranged in the data portion is the encoded video data is described in a header; and a recording control step of causing the packets to be recorded on a recording medium.

14. A non-transitory computer-readable medium including a program causing a computer to execute a process comprising:

an encoding step of encoding video data of a main image;

a generating step of generating packets in which offset information is arranged in a data portion and flag information indicating that data arranged in the data portion is the offset information is described in a header so that the video data encoded in a process of the encoding step and the offset information are not included in an identical packet, the offset information being composed of a shift direction and a shift amount of a left-eye sub-image and a right-eye sub-image used for 3D display with respect to a certain sub-image, and generating packets in which the encoded video data is arranged in a data portion and flag information indicating that data arranged in the data portion is the encoded video data is described in a header; and a recording control step of causing the packets to be recorded on a recording medium.

15. A non-transitory recording medium with data having the data structure according to claim 7 being recorded thereon.

16. A non-transitory recording medium with data having the data structure according to claim 8 being recorded thereon.

* * * * *